(12) United States Patent
Thomas et al.

(10) Patent No.: US 8,005,993 B2
(45) Date of Patent: Aug. 23, 2011

(54) SYSTEM AND METHOD OF A STORAGE EXPANSION UNIT FOR A NETWORK ATTACHED STORAGE DEVICE

(75) Inventors: Fred C. Thomas, Fort Collins, CO (US); Paul Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 11/742,376

(22) Filed: Apr. 30, 2007

(65) Prior Publication Data

US 2008/0270631 A1 Oct. 30, 2008

(51) Int. Cl.
*G06F 3/00* (2006.01)
*G06F 11/00* (2006.01)

(52) U.S. Cl. .............................. 710/2; 714/43
(58) Field of Classification Search ......... 710/2; 714/43
See application file for complete search history.

(56) References Cited

U.S. PATENT DOCUMENTS

| | | | |
|---|---|---|---|
| 5,787,461 A | 7/1998 | Stephens | |
| 6,446,091 B1 | 9/2002 | Noren et al. | |
| 6,606,690 B2 | 8/2003 | Padovano | |
| 6,611,836 B2 | 8/2003 | Davis et al. | |
| 6,832,281 B2 | 12/2004 | Jones et al. | |
| 6,915,315 B2 | 7/2005 | Autrey et al. | |
| 7,065,535 B2 | 6/2006 | Tol et al. | |
| 7,089,279 B1 | 8/2006 | Sakaguchi | |
| 7,171,532 B2 | 1/2007 | Kodama | |
| 7,191,287 B2 | 3/2007 | Nonaka et al. | |
| 7,392,425 B1 | 6/2008 | Schoenthal et al. | |
| 7,574,630 B1 * | 8/2009 | Ranaweera et al. | 714/43 |
| 2002/0083064 A1 | 6/2002 | Davis et al. | |
| 2002/0101711 A1 | 8/2002 | Gold | |
| 2003/0167367 A1 | 9/2003 | Kaushik et al. | |
| 2004/0017590 A1 | 1/2004 | Dugas | |
| 2004/0030668 A1 | 2/2004 | Pawlowski et al. | |
| 2004/0133607 A1 | 7/2004 | Miloushev et al. | |
| 2004/0186861 A1 | 9/2004 | Phatak | |
| 2004/0205143 A1 | 10/2004 | Uemura | |
| 2004/0213273 A1 | 10/2004 | Ma | |

(Continued)

FOREIGN PATENT DOCUMENTS

EP 1480141 A2 11/2004

(Continued)

OTHER PUBLICATIONS

Prmergy S60 Storage Subsystem, Sep. 2001, Fujitsu Siemens Computers GmbH.*

(Continued)

*Primary Examiner* — Henry Tsai
*Assistant Examiner* — Hyun Nam (57) ABSTRACT

A system and method of a storage expansion unit for a network attached storage device. At least some of the illustrative embodiments are storage expander systems comprising an enclosure, a communications port (the communication port configured to configured to operate under a communications protocol suitable for operatively accessing long term storage devices), and a port expander circuit within the enclosure and coupled to the communications port (the port expander circuit configured to have a plurality of secondary ports that operate under the communications protocol). The storage expansion system is configured to couple to a network attached storage device over the communications port, and wherein the storage expansion system is configured to facilitate external long-term storage for the network attached storage device.

16 Claims, 4 Drawing Sheets

U.S. PATENT DOCUMENTS

| | | |
|---|---|---|
| 2005/0038851 A1 | 2/2005 | Kriegsman |
| 2005/0060506 A1 | 3/2005 | Higaki et al. |
| 2005/0076178 A1 | 4/2005 | Coppock et al. |
| 2005/0086195 A1 | 4/2005 | Tan et al. |
| 2005/0120058 A1 | 6/2005 | Nishio |
| 2005/0193080 A1 | 9/2005 | Gold et al. |
| 2005/0289260 A1 | 12/2005 | Hamer et al. |
| 2006/0059303 A1 | 3/2006 | Takeda et al. |
| 2006/0129608 A1 | 6/2006 | Sato et al. |
| 2006/0143543 A1* | 6/2006 | Mandrell et al. ............... 714/43 |
| 2006/0179167 A1 | 8/2006 | Bomhoff et al. |
| 2006/0200599 A1 | 9/2006 | Manchester et al. |
| 2006/0206671 A1 | 9/2006 | Aiello et al. |
| 2006/0236060 A1 | 10/2006 | Shitomi et al. |
| 2006/0248382 A1 | 11/2006 | Fujibayashi |
| 2007/0016619 A1 | 1/2007 | Suriyanarayanan et al. |
| 2007/0078910 A1 | 4/2007 | Bopardikar |
| 2007/0083641 A1 | 4/2007 | Hu et al. |
| 2007/0098019 A1 | 5/2007 | Kelly et al. |
| 2007/0283090 A1 | 12/2007 | Kaji et al. |
| 2007/0294572 A1* | 12/2007 | Kalwitz et al. ..................... 714/9 |
| 2008/0091744 A1* | 4/2008 | Shitomi et al. ............... 707/204 |
| 2008/0177907 A1 | 7/2008 | Boerger et al. |
| 2009/0132752 A1 | 5/2009 | Poo et al. |

FOREIGN PATENT DOCUMENTS

| | | |
|---|---|---|
| KR | 1020020029441 A | 4/2002 |
| WO | WO2006125225 A2 | 11/2006 |
| WO | WO2007034460 A2 | 3/2007 |

OTHER PUBLICATIONS

David Sacks, Demystifying DAS, SAN, NAS, NAS Gateway, Fibre Channel, and iSCSI, Mar. 2001, IBM.*

SCSI Accessed Fault-Tolerant Enclosures, Apr. 14, 1997, nStor Corp.*

Charles M. Kozierok, 'Hard Disk Drive Activity LED', Apr. 17, 2001, The PC Guide.*

Marshall Brain, (http://web.archive.org/web/20040202024504/http://www.howstuffworks.com/usb.htm), How USB Ports Work, Feb. 4, 2004, p. 2.

WiseGeek, (http://web.archive.org/web/20050616002048/http://www.wisegeek.com/what-is-flash-memory.htm), What is Flash memory, Jun. 16, 2005, p. 2.

Greg Shultz, "Investigating Windows Vista's Recycle Bin Properties" http://artoc:es.tecjre[ib:oc.com.com, Jul. 6, 2006.

"Undelete Server Edition 5.0," 2 pp.; NewFreeDownloads.com; copyright 2005; http://www.newfreedownloads.com/Windows-Utilities/Backup/Undelete-Server-Edition.html.

"Undelete 5," 2 pp.; Diskeeper Corporation; copyright 2007; http://www.undelete.com/undelete/uddesktops.asp?Rld—1&Cld—1&Aeid—0&Apid—0&Sld—5.

Boerger et al., Reply Brief filed Dec. 30, 2009, U.S. Appl. No. 11/625,915, filed Jan. 23, 2007.

Boerger et al., Examiner Answer dated Nov. 23, 2009, U.S. Appl. No. 11/625,915, filed Jan. 23, 2007.

Boerger et al., Examiner Answer dated Oct. 30, 2009, U.S. Appl. No. 11/625,915, filed Jan. 23, 2007.

Boerger et al., Appeal Brief filed Aug. 12, 2009, U.S. Appl. No. 11/625,915, filed Jan. 23, 2007.

Boerger et al., Response to Final Office Action dated Jul. 10, 2009 filed Aug. 11, 2009, U.S. Appl. No. 11/625,915, filed Jan. 23, 2007.

Boerger et al., Final Office Action dated Jul. 10, 2009, U.S. Appl. No. 11/625,915, filed Jan. 23, 2007.

Boerger et al., Response to Office Action dated Dec. 31, 2008 filed Mar. 23, 2009, U.S. Appl. No. 11/625,915, filed Jan. 23, 2007.

Boerger et al., Office Action dated Dec. 31, 2008, U.S. Appl. No. 11/625,915, filed Jan. 23, 2007.

McJilton et al., Final Office Action dated Jun. 24, 2010, U.S. Appl. No. 11/741,696, filed Apr. 27, 2007.

McJilton et al., Response to Office Action dated Nov. 17, 2009, filed Feb. 17, 2010, U.S. Appl. No. 11/741,696, filed Apr. 27, 2007.

McJilton et al., Office Action dated Nov. 17, 2009, U.S. Appl. No. 11/741,696, filed Apr. 27, 2007.

McJilton et al., Response to Office Action dated May 28, 2009 filed Jul. 29, 2009, U.S. Appl. No. 11/741,696, filed Apr. 27, 2007.

McJilton et al., Office Action dated May 28, 2009, U.S. Appl. No. 11/741,696, filed Apr. 27, 2007.

Hanes, D. H., Appeal Brief filed Sep. 27, 2010, U.S. Appl. No. 11/740,462, filed Apr. 26, 2007.

Hanes, D. H., Office Action dated Jun. 28, 2010, U.S. Appl. No. 11/740,462, filed Apr. 26, 2007.

Hanes, D. H., Appeal Brief filed Feb. 26, 2010, U.S. Appl. No. 11/740,462, filed Apr. 26, 2007.

Hanes, D. H., Final Office Action dated Jan. 22, 2010, U.S. Appl. No. 11/740,462, filed Apr. 26, 2007.

Hanes, D. H., Response to Office Action dated Sep. 3, 2009 filed Oct. 15, 2009, U.S. Appl. No. 11/740,462, filed Apr. 26, 2007.

Hanes, D. H., Office Action dated Sep. 3, 2009, U.S. Appl. No. 11/740,462, filed Apr. 26, 2007.

Deutsches Patent—und Markenamt, Office Action dated Nov. 22, 2010, Application No. 11 2008 001 005.6-53 filed Apr. 25, 2008.

* cited by examiner

SYSTEM AND METHOD OF A STORAGE EXPANSION UNIT FOR A NETWORK ATTACHED STORAGE DEVICE

BACKGROUND

As home networks become more prevalent, so too does the need for centralized storage of data within the home. Home network attached storage devices are standalone devices which couple to all the computer systems of the home and provide the centralized data storage. However, increasing the centralized storage capacity of a home network attached storage device, if possible at all, is difficult and may require the user to disassemble the home network storage device and install additional long term storage devices.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
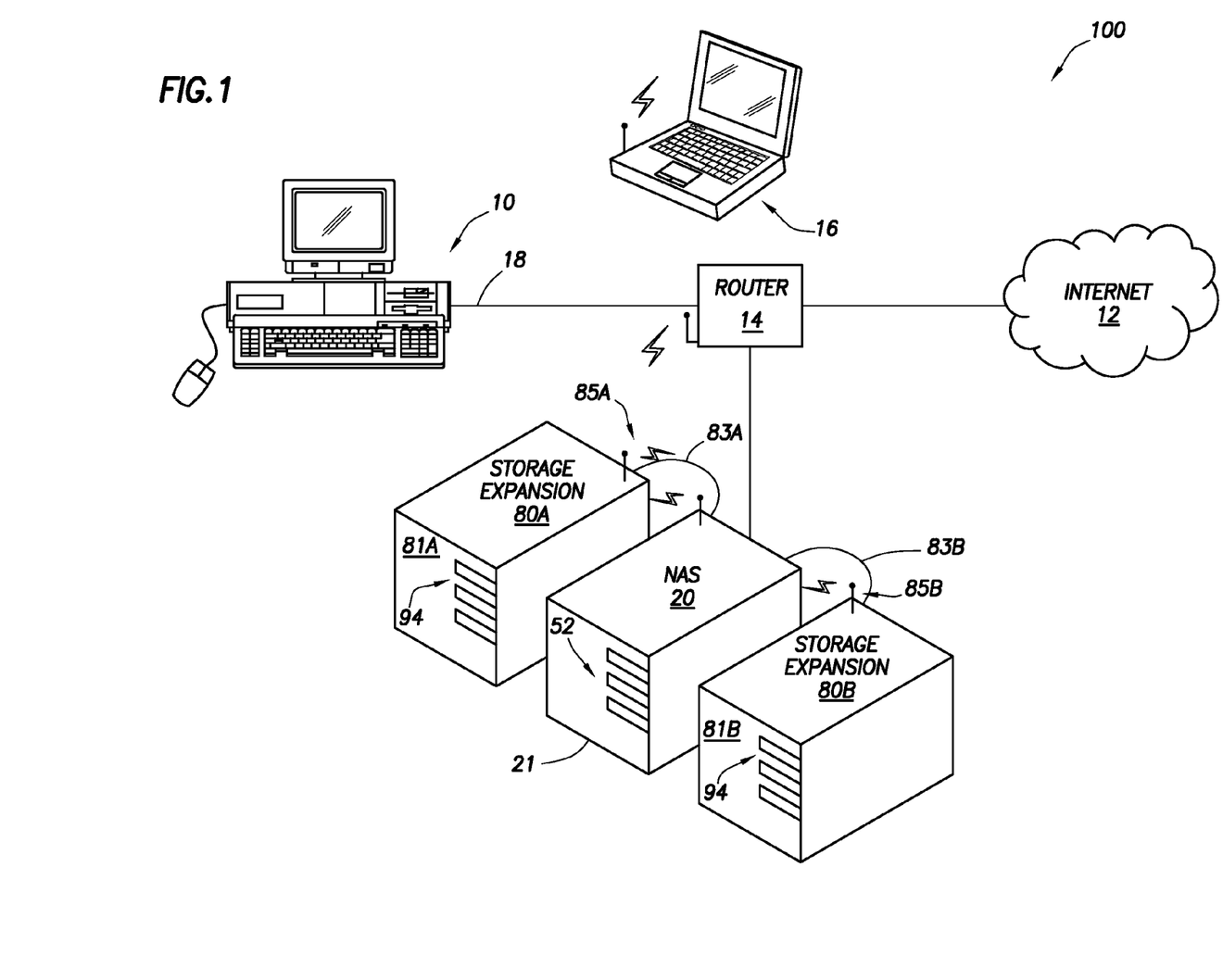
FIG. 1 shows a computer system in accordance with at least some embodiments.

FIG. 1 illustrates a home networking system 100 in accordance with at least some embodiments. In particular, the home networking system 100 comprises an illustrative desktop computer system 10 coupled to the Internet 12 by way of a router 14. The home networking system 100 also comprises a second computer system, in this case a portable computer 16 coupled to the Internet 12 by way of the router 14. In the embodiments illustrated in FIG. 1, desktop computer 10 couples to the router by way of a hardwired connection 18 (e.g., an Ethernet connection) and illustrative portable computer 16 couples to the router 14 wirelessly (e.g., IEEE 802.11, Bluetooth). However, computer systems may couple to the router in a hardwired fashion or wirelessly without regard to their portability. Further, while the system 100 of FIG. 1 shows only one desktop computer 10 and one portable computer 16, any number of computers may be coupled to the router using any networking functionality.

The home networking system 100 of FIG. 1 also comprises a network attached storage (NAS) device 20 within its own enclosure 21, the network attached storage device 20 coupled to the router 14. In accordance with at least some embodiments, the network attached storage device 20 is a storage device and/or server available to any computer system of the home networking system 100 (e.g., desktop computer 10 or portable computer 16). The network attached storage device 20 may be, for example, the central repository for data generated by computers of the home networking system 100. In the embodiments illustrated in FIG. 1, the storage implemented by network attached storage device 20 is accessible to other computers of the home networking system by way of any suitable currently available networking communication protocol (e.g., Internet Protocol (IP), Transmission Control Protocol/Internet Protocol (TCP/IP)), or any after-developed networking protocol.

Because the network attached storage device 20 is designed to act as a server for the home networking system 100, and possibly to reduce cost, in accordance with at least some embodiments the network attached storage device 20 does not support direct coupling of a display device and/or keyboard. Thus, in some embodiments the network attached storage device 20 does not comprise a graphics controller that would couple to a display, and also does not comprise an input/output (I/O) controller that would couple to I/O devices such as a keyboard and mouse. To the extent administration is performed on the network storage device 20, the administration may be accomplished remotely using computer systems (e.g., desktop computer 10 or portable computer 16) in the home networking system 100.

Figure 2:
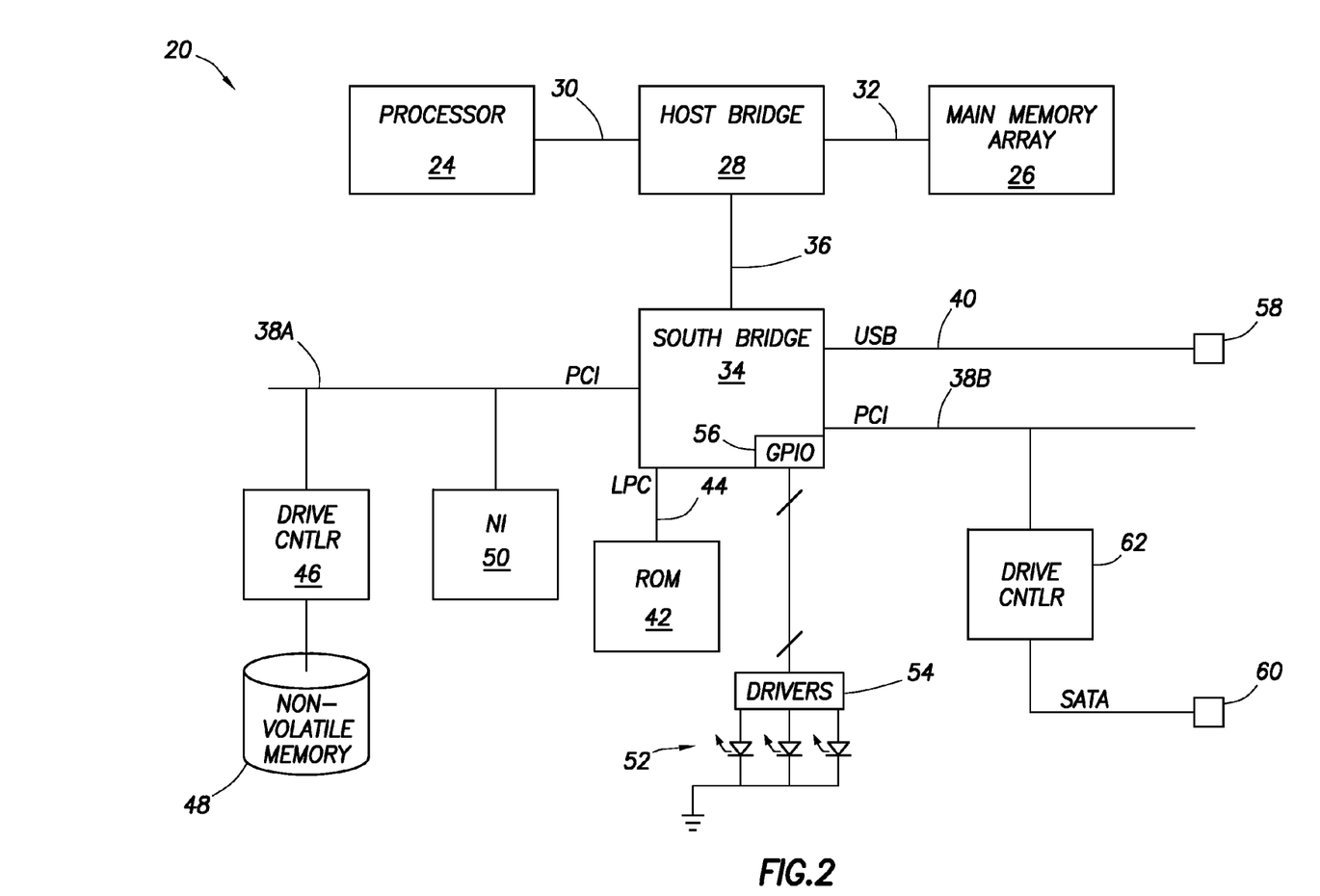
FIG. 2 shows a network attached storage device in accordance with at least some embodiments.

FIG. 2 illustrates in greater detail the network attached storage device 20. In particular, network attached storage device 20 comprises a processor 24 coupled to a main memory array 26, and various other components, through integrated host bridge 28 (sometimes referred to as a "north bridge" because of its location in computer system drawings). The processor 24 couples to the host bridge 28 by way of a host bus 30, or the host bridge 28 may be integrated into the processor 24. The processor 24 may be one of many available or after-developed processors, and thus the network attached storage device 20 may implement bus configurations or bus-bridges in addition to, or in place of, those shown in FIG. 2.

Main memory array 26 couples to the host bridge 28 through a memory bus 32. Those host bridge 28 comprises a memory control unit that controls transactions to the main memory 26 by asserting control signals for memory accesses. The main memory array 26 functions as the working memory for the processor 10 and comprises a memory device or array of memory devices in which programs, instructions and data are stored. The main memory array 26 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

Still referring to FIG. 2, the network attached storage device also comprises a second bridge 34 that bridges the primary expansion bus 36 to various secondary expansion buses, such as the peripheral component interconnect (PCI) bus 38 and the universal serial bus (USB) 40. The second bridge 34 is sometimes referred to as the "south bridge" because of its location in computer system drawings. Read only memory (ROM) 42 couples to the south bridge 34, such as by a low pin count (LPC) bus 44. The ROM 42 contains software programs executable by the processor 10 to enable the system 20 to perform as a network attached storage device, and also to communicate with storage expansion units (discussed more below).

Network attached storage device 20 further comprises a hard drive controller 46 coupled to the south bridge 34 by way of the illustrative PCI bus 38. In alternative embodiments, the hard drive controller may couple to the primary expansion bus 36, or any other currently available or after-developed expansion bus. The drive controller 46 controls the non-volatile memory 48 of a long term storage device, such as a hard drive or optical drive. In some embodiments, the network attached storage device 20 implements a single long term storage device where computer systems of the home network can store and retrieve data and programs. In alternative embodiments, the network attached storage device implements a redundant array of independent (or inexpensive) drive (RAID) system where the data and instructions written to the network attached storage 20 are duplicated across multiple long term storage devices to implement fault tolerance.

Also coupled to the illustrative PCI bus 38 is a network interface (NI) 50. The NI 50 enables the network attached storage device 20 to communication with computer systems on the home networking system 100 (through the router 14, both of FIG. 1) such that the network attached storage device 20 may act as the central repository for data and programs of the home network system. In alternative embodiments, the functionality of the NI 50 is integrated onto the motherboard along with the bridges 28 and 34.

In order to convey information to the user regarding the state of the network attached storage device 20, and given that in at least some embodiments the network attached storage device 20 does not have a directly coupled display device, a plurality of light emitting devices 52 (here illustrated as light emitting diodes (LEDs)) couple to the enclosure 21 in such a way as to be visible to the user. The light emitting devices 52 are also illustrated in FIG. 1. A driver circuit 54 provides control of the light emitting devices, which driver circuit may take commands from one or more general purpose input/output ports 56 of the south bridge 34. In alternative embodiments, the drivers may couple to, and receive commands from, any other suitable location, such as LPC bus 44.

The light emitting devices 52 may provide any suitable information. For example, there may be a light emitting device associated one each with each long term storage device in the network attached storage, and the light emitting device may visually convey to the user the status of the long term storage device. In some embodiments, the light emitting device associated with a particular long term storage device may emit blue light to indicate that the device is operational (whether being accessed or not), red to indicate device failure, and purple (combination of blue and red) to indicate that the device may be safely removed.

In accordance with some embodiments, the user may control attributes of the light emitting devices 52. For example, the user, through a software interface from the illustrative desktop system 10 or portable system 16, may change the intensity of the light emitted from the light emitting devices 52. The change of intensity may range from making the light emitting devices 52 easier to see (increasing intensity) to turning the light emitting devices off completely.

Still referring to FIG. 2, in addition to a communication port associated with NI 50 which couples to the router 14 (FIG. 1), the network attached storage device may further comprise one or more communications ports, some of which are accessible through the enclosure 21 (FIG. 1) for coupling to additional long term storage devices. FIG. 2 illustrates two hardwired ports being a USB port 58 and a port 60 operated under the Serial Advanced Technology Attachment (SATA) standard (hereinafter just the SATA port 60). Other ports and operating protocols may be equivalently used, such as wireless ports and ports operated under the Serially Attached Small Computer System Interface (Serially Attached SCSI or SAS) protocol. Both the illustrative USB port 58 and SATA port 60 are suitable for operatively accessing long term storage devices coupled to those ports, but the SATA port 60 is particularly suited for such actions. While the USB port 58 may be driven directly from the south bridge 34, an additional drive controller 62 may provide the interface for the SATA port 62. In alternative embodiments, the interface for the SATA port 62 may be integral with the south bridge 34, or the interface for the SATA port 62 may be provided by the driver controller 46 associated with the long term storage device(s) 48. As for the SATA port 60, the port may operate under any currently available SATA standard (e.g., the SATA 1.5 Giga bits per second (Gb/s) standard, the SATA 3.0 Gb/s standard, or the SATA 6.0 Gb/s) or any after-developed SATA standard.

Through the illustrative USB port 58 or SATA port 60 the storage capacity available to the user through the network attached storage device 20 may be increased. FIG. 1 illustrates two storage expansion units 80A and 80B coupled to the network attached storage device 20, with each storage expansion unit 80 having its own enclosure 81 and its own power supply (not specifically shown). FIG. 1 illustrates the storage expansion units 80 coupling to the network attached storage device 20 by way of hardwired connections 83 (e.g., to the port 58 and 60 of the network attached storage device 20), and also by way of wireless connections 85; however, one need not have both types of coupling present in any one system. Moreover, while the antennas are show external to the enclosures 21 and 81, the antennas may be equivalently located internal to the enclosures.

Figure 3:
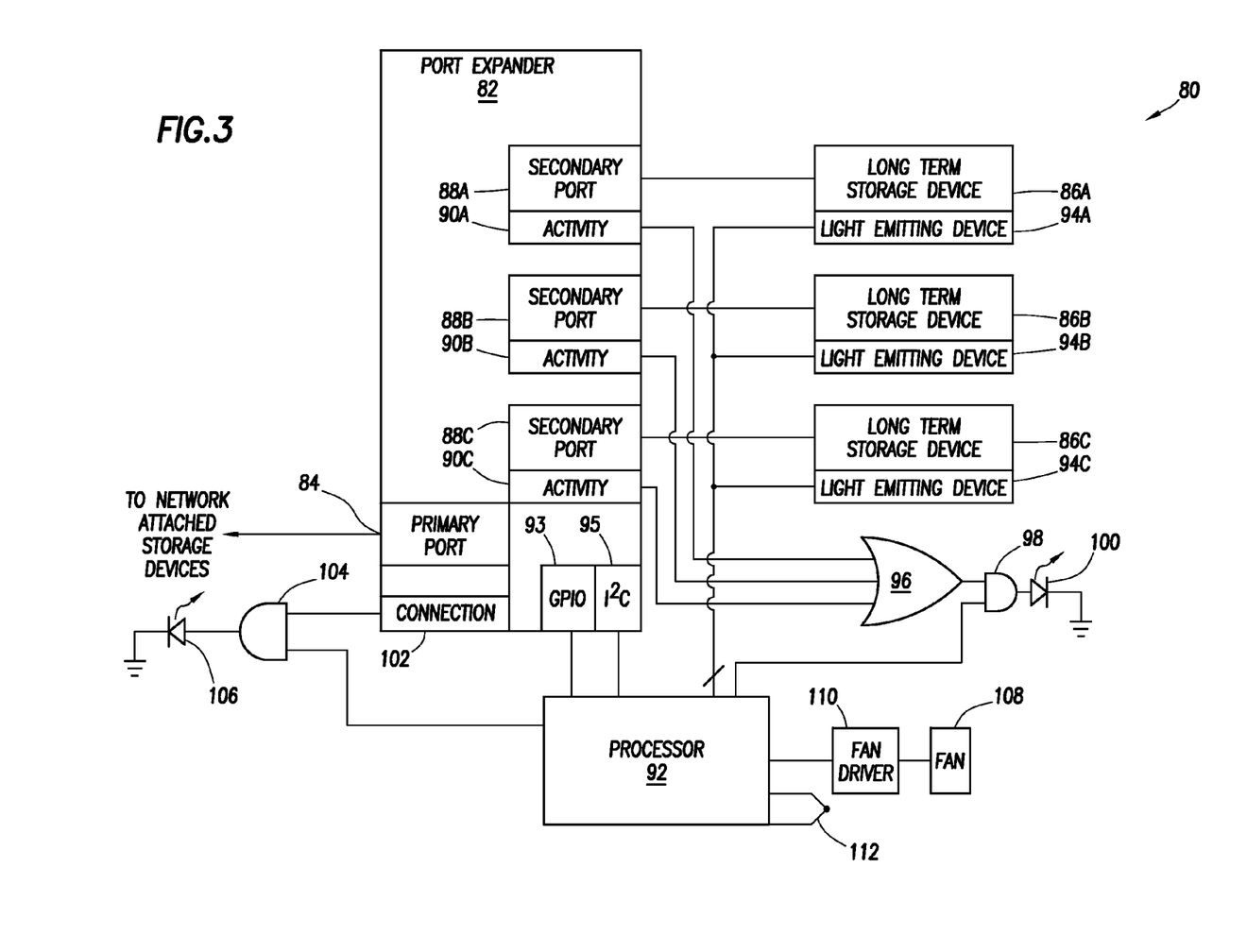
FIG. 3 shows a storage expansion unit in accordance with at least some embodiments.

FIG. 3 illustrates a storage expansion unit 80 in greater detail. In particular, FIG. 3 illustrates that a storage expansion unit 80 in accordance with some embodiments comprises a port expander circuit 82. The port expander circuit 82 couples to the network attached storage device 20 by way of primary communication port 84. The port expander 82 enables the network attached storage device 20 to communicate to a plurality of long term storage devices 86 (e.g., hard drives or optical drives) through a plurality of secondary communication ports 88. While three such secondary communication ports are shown in FIG. 3, two or more secondary communication ports may be used. In the illustrative case of the storage expansion unit 80 operating under SATA standard, the port expander circuit 82 may be a port expander circuit having part number Sil 4726 available from Silicon Image, Inc. of Las Vegas, Nev.

Port expander circuits such as the Sil 4726 have certain predefined functionality. For example, each secondary communication port 88 may have associated therewith an activity output signal 90. The activity output signals are active when there is activity (e.g., reading or writing) regarding the long term storage device to which the associated secondary communication port 88 is coupled. While it is possible to couple the activity output signals one each to light emitting devices associated with each long term storage device, presentation of mere activity of each long term storage device 86 may not be consistent with enclosure management philosophy of the network storage device 20. For example, as discussed above the light emitting devices 52 of the network attached storage device 20 do not necessarily convey mere device activity, and thus the light emitting devices 94 of the storage expansion units 80 may convey: whether their associated long term storage devices are operational (independent of whether accessed); whether their associated long term storage device has failed; or whether their associated long term storage device may be safely removed.

In order to present a consistent enclosure management operating philosophy as between the network attached storage device 20 and the storage expansion unit 80, and in accordance with at least some embodiments, the storage expansion unit 80 further comprises a processor 92 that couples to the network attached storage device 20. In some embodiments, the processor 92 couples to the network attached storage device 20 through the primary communication port 84 of the port expander 82, although other coupling mechanisms (e.g., independent communication pathway) may be equivalently used. In the illustrative case of FIG. 3, the processor 92 couples to the port expander circuit 82 through general purpose input/output ports 93 of the port expander circuit 82, through a secondary communication bus protocol port 95 supported by the port expander circuit 82 (e.g., Inter-integrated Circuit ($I^2C$) bus), or a combination of these.

The network attached storage device 20 communicates enclosure management commands to the processor 92. The processor 92, in turn, implements enclosure management functions based on the enclosure management commands. For example, processor 92 couples to light emitting devices 94 which are associated one each with long term storage device 86. The light emitting devices 94 are also illustrated in FIG. 1. In accordance with some embodiments, the network attached storage device 20 sends enclosure management commands to the processor 92 regarding the how to drive the light emitting devices 94. The processor 92, in turn, decodes the commands and drives the light emitting devices accordingly. Thus, operation of the light emitting devices is consistent across the network attached storage device 20 and the storage expansion units 80 to which the network attached storage device 20 attaches (e.g., blue light to indicate that the drive is operational (whether being accessed or not), red to indicate drive failure, and purple (combination of blue and red) to indicate that the device may be safely removed).

As yet another example of performing enclosure management functions by the storage expansion unit 80 based on enclosure management commands from the network attached storage device 20, consider the ability discussed above of a user to control the intensity or brightness of light emitted from the light emitting devices 52. In order to present a consistent operating philosophy, as the user commands changes to the intensity of the light emitted from the light emitting devices 52, the network attached storage device 20 sends enclosure management commands to the storage expansion unit 80 (particularly the processor 92) to change the intensity of light emitting devices of the storage expansion unit 80. The processor 92, in turn, drives and/or controls at least some of the light emitting devices to change the intensity. In the illustrative case of the light emitting devices 94 associated with the long term storage devices 86, the processor 92 may pulse-width modulate the signals to the light emitting devices to control the intensity. In the case of the activity signals 90 coupled to the logical OR gate 96, the processor 92 may present a pulse-width modulated signal to the logical AND gate 98, which in turn pulse-width modulates the signal to the light emitting device 100 (illustrated as an LED) which shows activity of the long term storage devices as a whole. By pulse-width modulating the signal, the intensity of the light can be controlled, even to the point of turning off the light at a zero percent duty cycle. In the case of the connection signal 102 coupled to the logical AND gate 104, the processor 92 may present a pulse-width modulated signal to the logical AND gate 104, which in turn pulse-width modulates the signal to the light emitting device 106 (illustrated as an LED) which shows health of the connection of the primary port 84 to the network attached storage device 20. By pulse-width modulating the signal, the intensity of the light can be controlled, even to the point of turning off the light.

As yet another example of performing enclosure management functions by the storage expansion unit 80 based on enclosure management commands from the network attached storage device 20, consider temperature measurement and control. Because the storage expansion unit 80 is within a dedicated enclosure 81, the enclosure 81 may have one or more fans 108 to cool the interior components. The processor 92 drives the fans at particular speeds, such as through a fan driver circuit 110. The location where decisions are made regarding fan speeds vary. In some embodiments, the processor 92 is programmed to read temperatures, such as through temperature sensor 112, and control fan speed accordingly. In other embodiments, the network attached storage device 20 may request an indication of temperature using the enclosure management commands. The processor 92, in turn, reads the temperature and sends an indication of the temperature over to the network attached storage device. The network attached storage device 20 may also command fan speed changes by sending enclosure management commands to the processor 92. The fan speed changes may be in response to the temperature values sent by the processor 92, or may be part of an overall control scheme (e.g., having fans from all the storage expansion units 80 operate at the same speed to limit noise variability).

Figure 4:
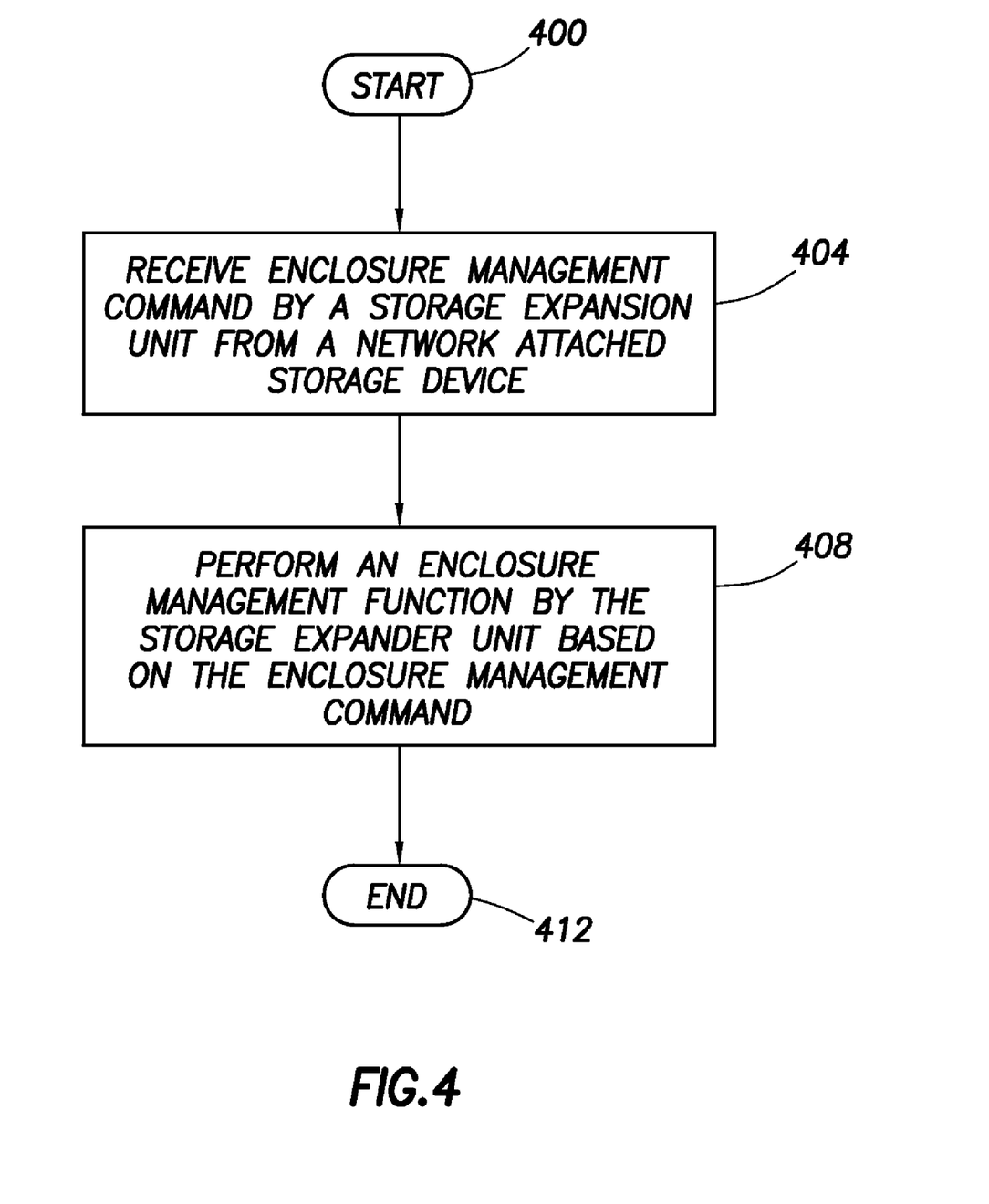
FIG. 4 shows a method in accordance with at least some embodiments.

FIG. 4 illustrates a method in accordance with at least some embodiments. In particular, the method starts (block 400) and then receives an enclosure management command by a storage expansion unit from a network attached storage device (block 404). The receiving could be over a dedicated connection between the storage expander unit and the network attached storage device, or embedded with other communication, such as communication over a SATA port. Thereafter, the network attached storage device performs the enclosure management function based on the enclosure management command (block 408), and the process ends (block 412). The enclosure management function can take many forms. In some embodiments, the enclosure management function is controlling a light emitting device on the storage expansion unit to mimic attributes of a light emitting device on the network attached storage device. In other embodiments, the enclosure management function is changing color emitted by a light emitting device on the storage expansion unit to indicate the operational state of a long term storage device. Yet still illustrative enclosure managements functions are: reading an internal temperature and sending the internal temperature to the network attached storage device by the storage expander unit; controlling an enclosure fan speed based the enclosure management command; or dimming a light emitting device based on the enclosure management command.

The above discussion is meant to be illustrative of the principles and various embodiments of the present invention. Numerous variations and modifications will become apparent to those skilled in the art once the above disclosure is fully appreciated. For example, the storage expansion units 80 may couple to network attached storage devices from different manufacturers, in which case the consistent application of enclosure management philosophy may not be needed. In such circumstances, the storage expansion units 80 may operate standalone, performing enclosure management function without regard to the devices coupled to the primary expansion ports 84. Moreover, while hardwired connections between the network attached storage device 20 and the storage expansion units 80 are shown, wireless connections between these devices may be equivalently used. Further still, FIG. 3 shows several logic operation gates (i.e., AND and OR gates), but any electrical circuit which performs the logical operations may be equivalently used. Finally, FIG. 2 illustrates the storage expansion units 80 as "computer-style" systems comprising various individual bridge devices and interconnected buses; however, the storage expansion units 80 may equivalently comprise Systems-on-Chip (SoC) devices such that most if not all the functionality is implemented in the form of single integrated circuit. It is intended that the following claims be interpreted to embrace all such variations and modifications.

What is claimed is:

1. A storage expander system comprising:
    a first enclosure;
    a communications port, the communication port configured to operate under a communications protocol to operatively accessing at least one long term storage devices;
    a port expander circuit within the first enclosure and coupled to the communications port, the port expander circuit configured to have a plurality of secondary ports that operate under the communications protocol for accessing at least one long term storage device; and
    a processor within the first enclosure;
    wherein the storage expander system is configured to couple to a network attached storage (NAS) device over the communications port, the NAS residing within an enclosure external to the first enclosure, and the NAS device provides external long-term storage for a computer system coupled to the NAS device;
    wherein the storage expander system receives information from the NAS over the communications port for long-term storage in at least one long term storage device; and
    wherein the processor receives an enclosure management command from the NAS over the communications port and performs an enclosure management function based on the enclosure management command.

2. The storage expander system as defined in claim 1 further comprising a plurality of long term storage devices coupled one each to each of the plurality of secondary ports of the port expander circuit.

3. The storage expander system as defined in claim 1 further comprising:
    a light emitting device coupled to the processor;
    wherein the processor is configured to selectively control the light emitting device based on the enclosure management commands received from the NAS device over the communications port.

4. The storage expander system as defined in claim 3 wherein the light emitting device is a light emitting diode.

5. The storage expander system as defined in claim 3 wherein the processor selective control of the light emitting device is at least on selected from the group consisting of: brightness control of the light emitting device; control of light color emitted from the light emitting device; and control of an on-off state of the light emitting device.

6. The storage expander system as defined in claim 3 wherein the light emitting device is indicative of at least one selected from the group consisting of: communications port link status; long term storage device activity; long term storage device mounted state; and long term storage device failure.

7. A system comprising:
    a network attached storage device that couples to a computer system, the network attached storage device configured to provide external storage for the computer system;
    a storage expander unit coupled to the network attached storage device, the storage expander unit configured to receive from a communications port data for long-term storage from the network attached storage, the storage expander unit comprising:
    a storage expander enclosure;
    a processor within the storage expander enclosure; and
    a light emitting device coupled to the storage expander enclosure;
    wherein the processor is configured to selectively control an attribute of light emitted from the light emitting device based on commands received from the network attached storage device.

8. The system as defined in claim 7 wherein the light emitting device is selectively controlled to mimic an attribute of a light emitting device on the network attached storage device.

9. The system as defined in claim 7 wherein the storage expander unit couples to the network attached storage device by a wireless communication protocol.

10. The system as defined in claim 7 wherein the attribute is at least one selected from the group consisting of: brightness control of the light emitting devices; color control of the light emitting devices; or on-off control of the light emitting devices.

11. A method comprising:
    receiving, by a storage expander unit, data via a communications port from a network attached storage coupled to a computer system and coupled to the storage expander unit;
    storing, by the storage expander unit, the received data in at least one long term storage device within the storage expander unit;
    receiving, by a processor within the storage expander unit, an enclosure management command from the network attached storage device to which the storage expander unit is coupled;
    performing, by the processor within the storage expander unit, an enclosure management function unit based on the enclosure management command.

12. The method as defined in claim 11 wherein performing the enclosure management function further comprises controlling a light emitting device to mimic attributes of a light emitting device on the network attached storage device.

13. The method as defined in claim 11 wherein performing the enclosure management function further comprises changing color emitted by a light emitting device to indicate the operational state of a long term storage device.

14. The method as defined in claim 13 wherein performing the enclosure management function further comprises at least one selected from group consisting of: reading an internal temperature and sending the internal temperature to the network attached storage device by the storage expander unit; controlling an enclosure fan speed based the enclosure management command; and dimming a light emitting device based on the enclosure management command.

15. The storage expander system of claim 1, further comprising multiple long term storage devices within the first enclosure.

16. The system of claim 7, further comprising at least one long term storage device within the storage expander enclosure.

* * * * *